United States Patent
Irie (10) Patent No.: US 10,461,681 B2
(45) Date of Patent: Oct. 29, 2019

(54) INVERTER CONTROL DEVICE

(71) Applicant: DENSO CORPORATION, Kariya, Aichi-pref. (JP)

(72) Inventor: Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/079,700

(22) PCT Filed: Feb. 13, 2017

(86) PCT No.: PCT/JP2017/005149
§ 371 (c)(1),
(2) Date: Aug. 24, 2018

(87) PCT Pub. No.: WO2017/145841
PCT Pub. Date: Aug. 31, 2017

(65) Prior Publication Data
US 2019/0074791 A1 Mar. 7, 2019

(30) Foreign Application Priority Data
Feb. 24, 2016 (JP) .................................. 2016-033533

(51) Int. Cl.
*H02P 27/08* (2006.01)
*H02M 7/5395* (2006.01)
(Continued)

(52) U.S. Cl.
CPC .......... *H02P 27/08* (2013.01); *H02M 7/5395* (2013.01); *H02P 23/0027* (2013.01);
(Continued)

(58) Field of Classification Search
CPC ........ H02P 27/08; H02P 21/22; H02P 28/085; B60W 10/08; B60W 20/00
See application file for complete search history.

(56) References Cited

U.S. PATENT DOCUMENTS

| 5,491,393 A | 2/1996 | Uesugi |
| 2002/0140395 A1 | 10/2002 | Tazawa et al. |

(Continued)

FOREIGN PATENT DOCUMENTS

JP 2014-143831 A 8/2014

OTHER PUBLICATIONS

Mar. 21, 2017 International Search Report issued in International Patent Application No. PCT/JP2017/005148.
(Continued)

*Primary Examiner* — Shawki S Ismail
*Assistant Examiner* — Zoheb S Imtiaz
(74) *Attorney, Agent, or Firm* — Oliff PLC (57) ABSTRACT

A control device stores a plurality of operation patterns associated with each of synchronous numbers and modulation factors, and the synchronous numbers each define the upper limit of the number of switching operations for each switch constituting an inverter. The control device selects an appropriate operation pattern from among the stored operation patterns, and operates each switch on the basis of the selected operation pattern. The control device stores a plurality of operation patterns associated with the same modulation factor for the same synchronous number. In a case where there is a plurality of next patterns as operation patterns corresponding to a next modulation factor, the control device selects, from among the next patterns, an operation pattern with a small change from a currently set operation pattern.

7 Claims, 9 Drawing Sheets

(51) Int. Cl.
   *H02P 23/00*    (2016.01)
   *H02P 101/45*   (2016.01)
(52) U.S. Cl.
   CPC ........ *H02P 27/085* (2013.01); *H02P 2101/45* (2015.01); *H02P 2207/05* (2013.01); *H02P 2209/09* (2013.01)

(56) References Cited

U.S. PATENT DOCUMENTS

| | | |
|---|---|---|
| 2010/0134053 A1 | 6/2010 | Yamada et al. |
| 2017/0331410 A1* | 11/2017 | Kondo .................... H02P 21/18 |
| 2018/0358911 A1* | 12/2018 | Kojima ................... H02P 6/153 |
| 2019/0089266 A1* | 3/2019 | Iwazaki ................ H02M 1/126 |

OTHER PUBLICATIONS

May 9, 2017 International Search Report issued in International Patent Application No. PCT/JP2017/005149.
May 9, 2017 Written Opinion issued in International Patent Application No. PCT/JP2017/005149.
Mar. 21, 2017 Written Opinion issued in International Patent Application No. PCT/JP2017/005148.
U.S. Appl. No. 15/999,612, filed Aug. 20, 2018 in the name of Koji Irie.
Jul. 26, 2019 Office Action issued in U.S. Appl. No. 15/999,612.

* cited by examiner

| N | Mr | | | | | | | | |
|---|---|---|---|---|---|---|---|---|---|
|   | $M_{min}$ | ... | ... | $M_i$ | $M_{i+1}$ | ... | ... | ... | $M_{max}$ |
| 12 | ////// | ////// | ////// | PPa | PPb | ////// | ////// | ////// | ////// |

$\underbrace{\qquad\qquad\qquad}_{Np=11} \underbrace{\qquad\qquad\qquad\qquad}_{Np=5}$

PPa

PPb

| N | T | Mr | | | | | | | | | | |
|---|---|---|---|---|---|---|---|---|---|---|---|---|
| | | $M_{min}$ | ... | ... | $M_{i-1}$ | $M_i$ | $M_{i+1}$ | $M_{i+2}$ | ... | ... | ... | $M_{max}$ |
| 12 | 0 | | | | | | $PP_a$ | $PP_{i+1}$ | $PP_{i+2}$ | | | |
| | 1 | | | | $PP_{i-1}$ | $PP_i$ | $PP_b$ | | | | | |

INVERTER CONTROL DEVICE

CROSS-REFERENCE TO RELATED APPLICATION

The present application is based on Japanese Patent Application No. 2016-033533 filed on Feb. 24, 2016, the entire contents of which are incorporated herein by reference.

TECHNICAL FIELD

The present disclosure relates to a control device that is applied to an inverter including series connections of upper arm switches and lower arm switches.

BACKGROUND ART

Patent Literature 1 (PTL 1) below is a known example of this type of control device. Specifically, upper and lower arm switches are alternately turned on based on a pulse pattern that defines a switching pattern for each arm switch. Pulse patterns are stored in a memory of the control device in association with modulation factors for each synchronous number that defines the upper limit of the number of switching operations for each of the arm switches.

CITATION LIST

Patent Literature

[PTL 1] JP 4858597 B

SUMMARY OF THE INVENTION

For each synchronous number, the pulse pattern associated with a specific modulation factor of a plurality of modulation factors may be significantly different from the pulse pattern associated with a modulation factor adjacent to the specific modulation factor. This is because the method of generating the pulse pattern associated with the specific modulation factor is different from the method of generating the pulse pattern associated with the modulation factor adjacent to the specific modulation factor. In particular, generation methods are considered different from each other in a case where, for example, a generation method based on three-phase modulation and a generation method based on two-phase modulation are employed, or where the number of switching operations realized by a pulse pattern is different from that realized by another pulse pattern.

Therefore, even when the currently set synchronous number is the same as the synchronous number to be set next time, the currently set pulse pattern can be significantly different from the pulse pattern to be set next time. In this case, the output power from the inverter is liable to fluctuate once the pulse pattern is switched. Note that the wait time for pulse pattern switching may be provided to limit fluctuations in output power. In this case, however, the responsiveness for controlling the output power from the inverter in a desired manner is reduced.

A main object of the present disclosure is to provide an inverter control device capable of limiting fluctuations in the output power from an inverter.

Hereinafter, means of solving the above-mentioned problems and the effects thereof will be described.

The present disclosure is applied to an inverter including a series connection of an upper arm switch and a lower arm switch, a time-series pattern that defines a switching pattern for each of the upper arm switch and the lower arm switch is defined as an operation pattern. The present disclosure includes: a pattern storage unit that stores a plurality of the operation patterns associated with each of synchronous numbers and modulation factors, the synchronous numbers each defining an upper limit of the number of switching operations for each of the arm switches; a pattern selecting unit that selects an appropriate operation pattern from among the operation patterns stored in the pattern storage unit; and an operation unit that operates the upper arm switch and the lower arm switch on the basis of the operation pattern selected by the pattern selecting unit, the pattern storage unit stores a plurality of the operation patterns associated with the same modulation factor for the same synchronous number, and in a case where there is a plurality of next patterns as the operation patterns corresponding to a next modulation factor, the pattern selecting unit selects, from among the next patterns, an operation pattern other than an operation pattern with the largest change from a currently set operation pattern.

In the above disclosure, the pattern storage unit stores a plurality of operation patterns associated with the same modulation factor for the same synchronous number. In a case where there is a plurality of next patterns as operation patterns corresponding to a next modulation factor, the pattern selecting unit selects, from among the next patterns, an operation pattern other than an operation pattern with the largest change from a currently set operation pattern. Therefore, significant difference between the currently set operation pattern and the operation pattern to be set next time can be avoided. Consequently, fluctuations in the output power from the inverter triggered by operation pattern switching can be limited.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

First Embodiment

Hereinafter, the first embodiment for putting a control device according to the present disclosure into practice will be described with reference to the drawings. The control device according to the present embodiment is applied to a three-phase inverter connected to a three-phase rotating electrical machine. The control device and the rotating electrical machine are mounted in a vehicle such as an electric car and a hybrid car.

Figure 1:
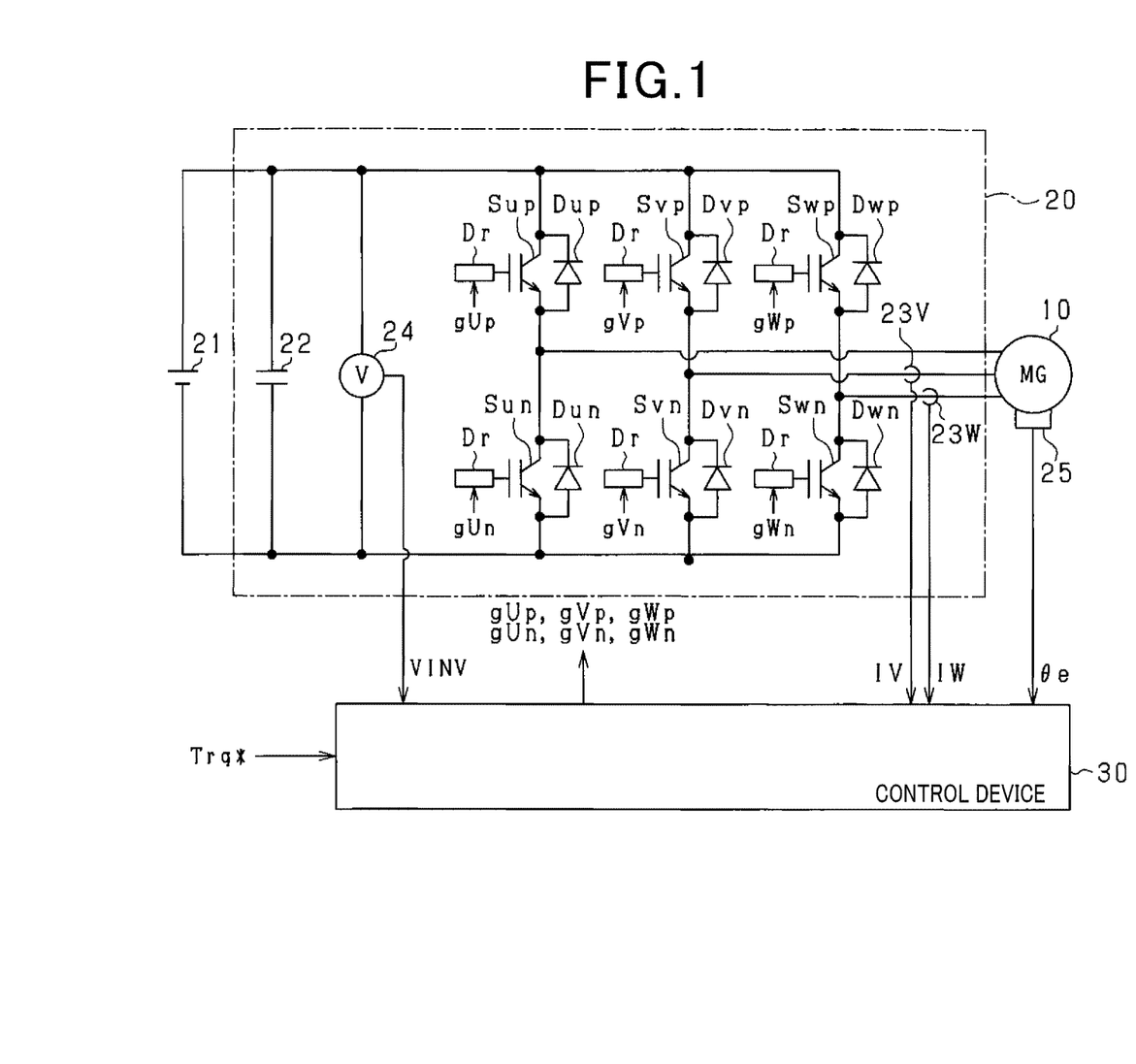
FIG. 1 is an overall configuration diagram of a motor control system according to a first embodiment.

As illustrated in FIG. 1, a motor control system includes a motor generator 10, a three-phase inverter 20, and a control device 30. In the present embodiment, the motor generator 10 is an in-vehicle main engine, and the rotor thereof is mechanically connected to driving wheels (not illustrated). In the present embodiment, a synchronous machine is used as the motor generator 10. In particular, a permanent magnet embedded synchronous machine is used as the motor generator 10.

The motor generator 10 is connected to a battery 21 that serves as a DC power source via the inverter 20. The output voltage from the battery 21 is, for example, 100 V or more. Note that a smoothing capacitor 22 that smooths the input voltage to the inverter 20 is provided between the battery 21 and the inverter 20.

It is to be noted that in a case where a boost converter that increases the output voltage from the battery 21 for output to the inverter 20 is provided in a control system, the boost converter corresponds to a DC power source.

The inverter 20 includes series connections of upper arm switches Sup, Svp, and Swp and lower arm switches Sun, Svn, and Swn. The number of series connections is equal to the number of phases. Each series connection is connected in parallel with the battery 21. The connection point between the U-phase upper arm switch Sup and the U-phase lower arm switch Sun is connected to the U phase of the motor generator 10. The connection point between the V-phase upper arm switch Svp and the V-phase lower arm switch Svn is connected to the V phase of the motor generator 10. The connection point between the W-phase upper arm switch Swp and the W-phase lower arm switch Swn is connected to the W phase of the motor generator 10. In the present embodiment, voltage-controlled semiconductor switching elements are used as the switches Sup, Sun, Svp, Svn, Swp, and Swn. In particular, IGBTs are used. Freewheeling diodes Dup, Dun, Dvp, Dvn, Dwp, and Dwn are connected in inverse parallel with the switches Sup, Sun, Svp, Svn, Swp, and Swn, respectively.

The motor control system further includes a phase current detector that detects at least two of the phase currents that flow into the motor generator 10. In the present embodiment, the phase current detector includes a V-phase current detector 23V that detects the current that flows into the V phase of the motor generator 10 and a W-phase current detector 23W that detects the current that flows into the W phase of the motor generator 10. The motor control system also includes a voltage detector 24 and an angle detector 25. The voltage detector 24 detects the output voltage from the battery 21 as a power supply voltage VINV to the inverter 20. The angle detector 25 detects an electrical angle $\theta e$ of the motor generator 10. Note that a resolver can be used as the angle detector 25, for example.

The control device 30 mainly includes a microcomputer, and operates the inverter 20 so as to feed the amount of control of the motor generator 10 back to a command value therefor. In the present embodiment, the amount of control is torque, and the command value therefor is command torque Trq*. In order to turn on or off the switches Sup, Sun, Svp, Svn, Swp, and Swn constituting the inverter 20, the control device 30 respectively generates operation signals gUp, gUn, gVp, gVn, gWp, and gWn on the basis of values detected by the respective detectors, and outputs the generated operation signals gUp, gUn, gVp, gVn, gWp, and gWn to drive circuits Dr corresponding to the respective switches. The operation signals gUp, gVp, and gWp for the upper arms and the operation signals gUn, gVn, and gWn for the corresponding lower arms are complementary to each other. Specifically, an upper arm switch and the corresponding lower arm switch are alternately turned on. Note that the command torque Trq* is output, for example, from a higher-level control device provided outside the control device 30.

Figure 2:
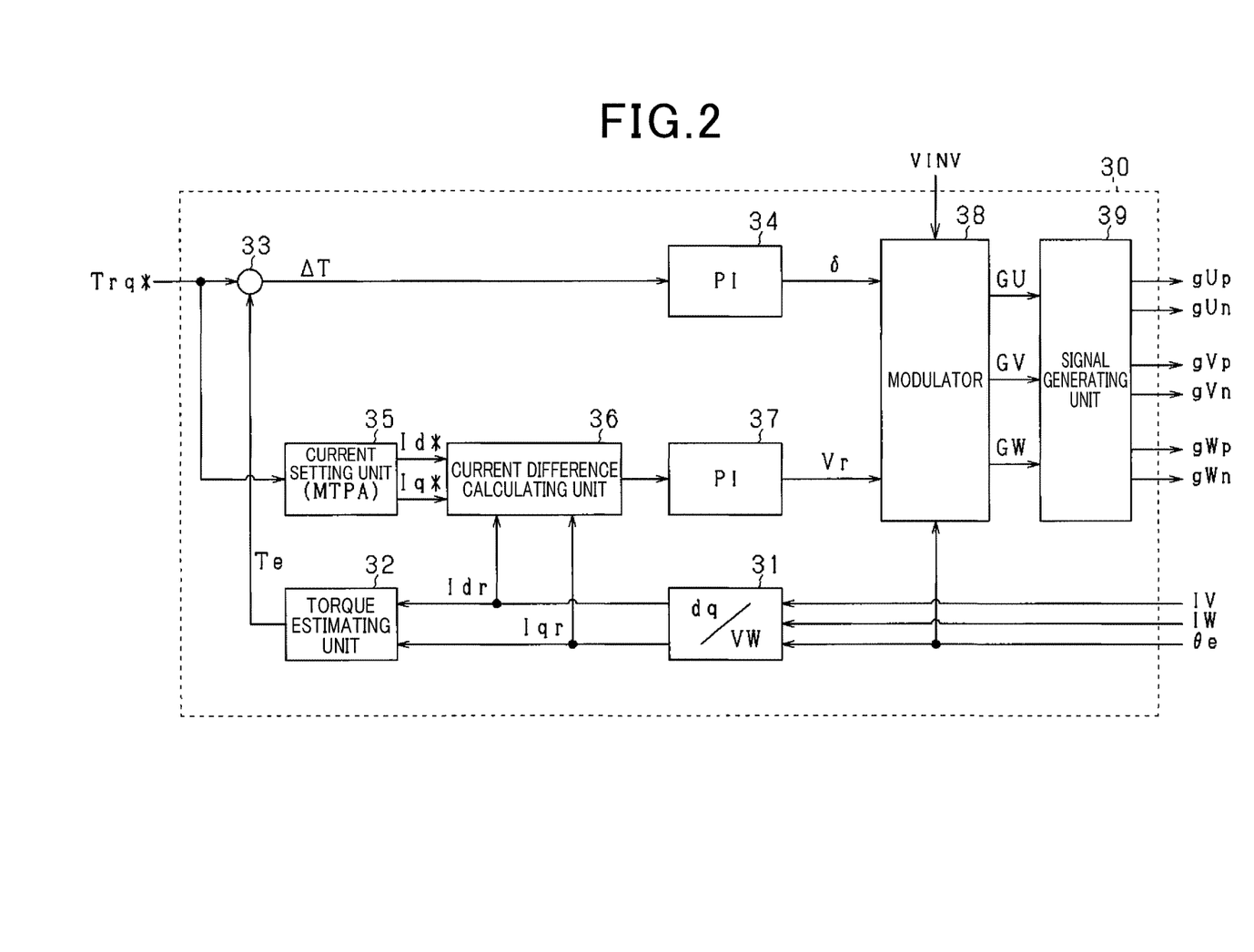
FIG. 2 is a block diagram illustrating a motor control process.

Next, the process of generating the operation signals performed by the control device 30 will be described using FIG. 2.

On the basis of a V-phase current IV detected by the V-phase current detector 23V, a W-phase current IW detected by the W-phase current detector 23W, and the electrical angle $\theta e$ detected by the angle detector 25, a two-phase converting unit 31 converts a U-phase current IU, the V-phase current IV, and the W-phase current IW in the three-phase fixed coordinate system of the motor generator 10 into a d-axis current Idr and a q-axis current Iqr in the dq coordinate system that is a two-phase rotating coordinate system.

A torque estimating unit 32 calculates an estimated torque Te of the motor generator 10 on the basis of the d-axis current Idr and the q-axis current Iqr output from the two-phase converting unit 31. The estimated torque Te may be calculated using a map indicating d-axis currents Idr and q-axis currents Iqr associated with estimated torques Te, or may be calculated using a model formula.

A torque difference calculating unit 33 calculates a torque difference $\Delta T$ by subtracting the estimated torque Te from the command torque Trq*.

On the basis of the torque difference $\Delta T$ calculated by the torque difference calculating unit 33, a phase calculating unit 34 calculates a command voltage phase $\delta$ as the amount of operation for feeding the estimated torque Te back to the command torque Trq*. The command voltage phase $\delta$ is a command value for the voltage phase of the output voltage vector of the inverter 20. In the present embodiment, the command voltage phase $\delta$ is calculated through proportional-integral control that uses the torque difference $\Delta T$ as input.

Note that the output voltage vector is defined by a d-axis voltage Vd that is a d-axis component of the output voltage vector in the dq coordinate system and a q-axis voltage Vq that is a q-axis component of the output voltage vector in the dq coordinate system. In the present embodiment, assuming that the positive direction of the d-axis is a reference, the positive direction of the voltage phase is defined as the counterclockwise direction from the reference.

On the basis of the command torque Trq*, a current setting unit 35 calculates a d-axis command current Id* and a q-axis command current Iq* for realizing the command torque Trq*. In the present embodiment, currents for realizing maximum torque per ampere control are calculated as the d-axis command current Id* and the q-axis command current Iq*.

A current difference calculating unit 36 calculates a d-axis current difference ΔId by subtracting the d-axis current Idr from the d-axis command current Id*. The current difference calculating unit 36 also calculates a q-axis current difference ΔIq by subtracting the q-axis current Iqr from the q-axis command current Iq*.

On the basis of the d-axis current difference ΔId and the q-axis current difference ΔIq, a voltage setting unit 37 calculates a command voltage amplitude Vr that is a command value for the voltage amplitude of the output voltage vector. Here, the voltage amplitude is defined as the square root of the sum of the square of the d-axis voltage Vd and the square of the q-axis voltage Vq. The voltage setting unit 37 first calculates a d-axis command voltage Vd* as the amount of operation for feeding the d-axis current Idr back to the d-axis command current Id* on the basis of the d-axis current difference ΔId, and calculates a q-axis command voltage Vq* as the amount of operation for feeding the q-axis current Iqr back to the q-axis command current Iq* on the basis of the q-axis current difference ΔIq. In the present embodiment, proportional-integral control is used as the feedback control. The voltage setting unit 37 then calculates the command voltage amplitude Vr on the basis of the d-axis command voltage Vd* and the q-axis command voltage Vq*.

On the basis of the command voltage phase δ, the command voltage amplitude Vr, the power supply voltage VINV detected by the voltage detector 24, and the electrical angle θe, a modulator 38 generates PWM signals GU, GV, and GW from which the operation signals gUp, gUn, gVp, gVn, gWp, and gWn are generated. The modulator 38 will be described in detail later.

A signal generating unit 39 generates the operation signals gUp, gUn, gVp, gVn, gWp, and gWn by performing the process of separating the logical inversion timings for the PWM signals GU, GV, and GW and the logical inversion signals thereof from one another by the dead time.

Figure 3:
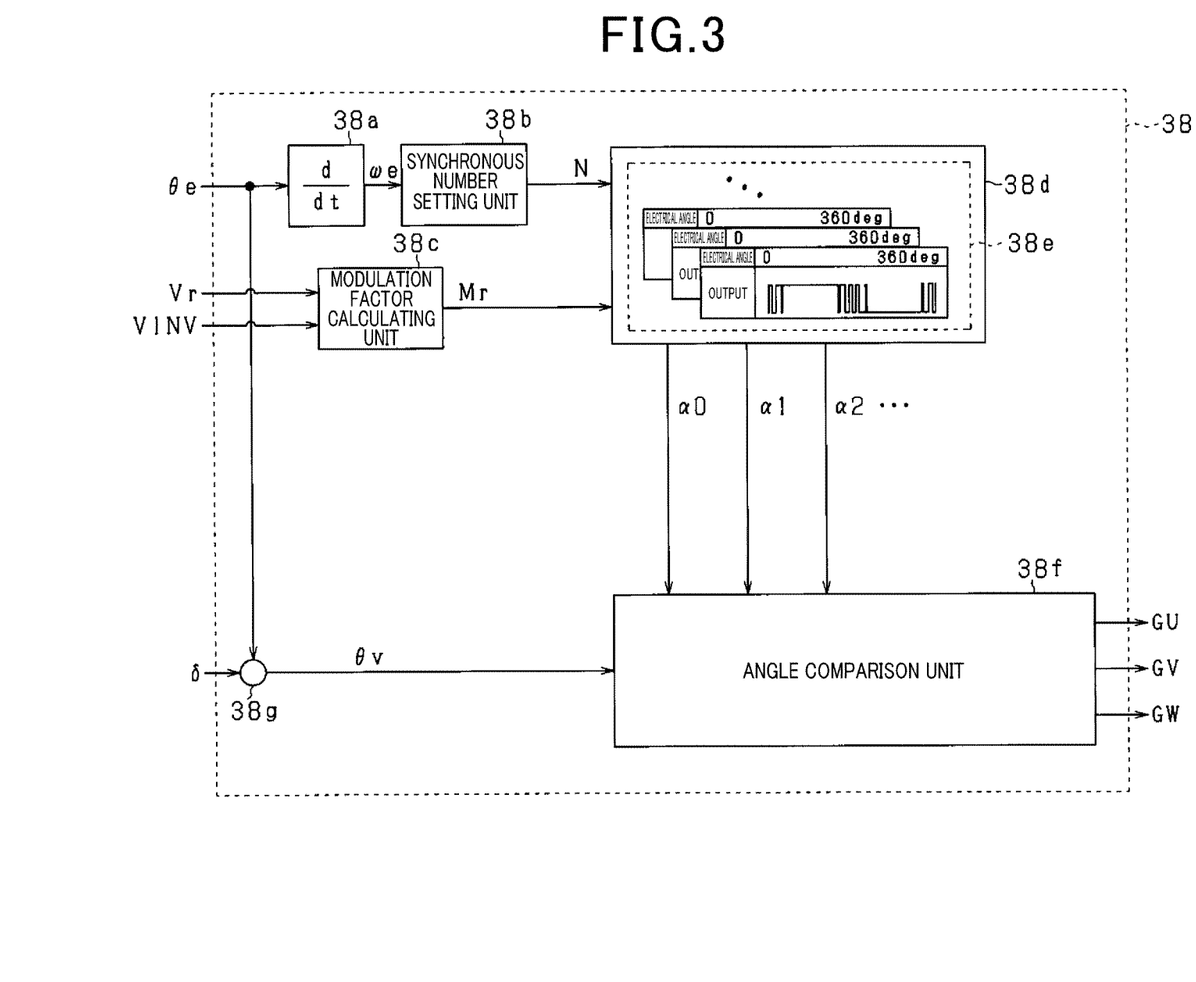
FIG. 3 is a block diagram illustrating a process of a modulator.

Next, the modulator 38 will be described using FIG. 3. In the present embodiment, the modulator 38 generates the PWM signals GU, GV, and GW by pulse pattern control.

A speed calculating unit 38a calculates an electric angular velocity we of the motor generator 10 on the basis of the electrical angle θe.

A synchronous number setting unit 38b calculates a synchronous number N on the basis of the electric angular velocity we and a synchronous number table. The reason why this calculation process is performed is that a pulse pattern is generated using the idea of synchronous triangular wave comparison PWM control that makes the integral multiple of one period of a carrier Sc equal to one electrical angle period. The synchronous number table is information indicating a plurality of electric angular velocity regions and synchronous numbers N associated with each other in advance. In the present embodiment, examples of synchronous numbers N associated with the respective electric angular velocity regions include multiples of three: "3, 6, 9, 12, 15, etc." The upper limit threshold values ω3, ω6, ω9, ω12, ω15, etc. of the electric angular velocity regions associated with the respective synchronous numbers 3, 6, 9, 12, 15, etc. are set with ω(N)=2π×fcmax/N. Note that fcmax indicates the upper limit frequency of the carrier Sc.

A modulation factor calculating unit 38c calculates a modulation factor Mr on the basis of the command voltage amplitude Vr and the power supply voltage VINV. Here, the modulation factor Mr is obtained by normalizing the command voltage amplitude Vr with the power supply voltage VINV. In the present embodiment, the modulation factor Mr is calculated using the following equation (eq1). The modulation factor Mr is information corresponding to the amplitude of a fundamental wave component of the output voltage from the inverter 20.

[Formula 1]

$$Mr = \frac{1}{\sqrt{1.5}} \frac{Vr}{\frac{VINV}{2}} \times 100 \tag{eq1}$$

On the basis of the synchronous number N output from the synchronous number setting unit 38b, the modulation factor Mr output from the modulation factor calculating unit 38c, and a mode T (described later), a pulse pattern selecting unit 38d selects a pulse pattern that is a switching pattern over one electrical angle period. In the present embodiment, a pulse pattern corresponds to an operation pattern. Pulse patterns are stored in advance in a pattern storage unit 38e in association with synchronous numbers N, modulation factors Mr, and modes T.

Figure 4:
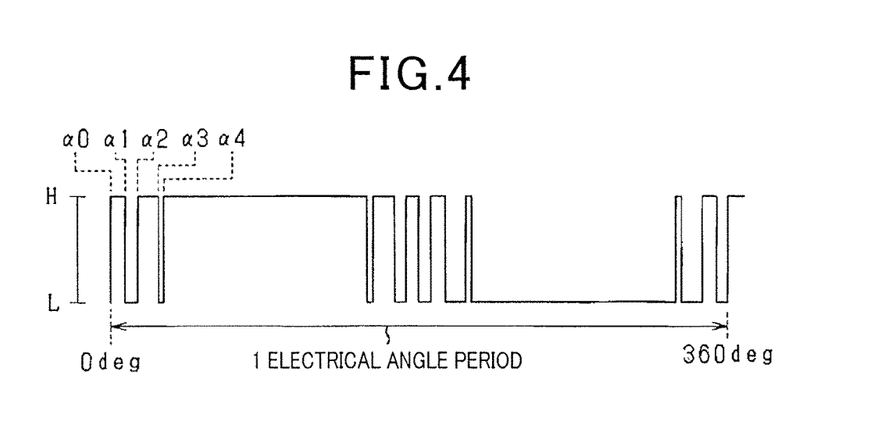
FIG. 4 is a diagram schematically illustrating a pulse pattern.

As illustrated in FIG. 4, a pulse pattern is information indicating, in association with electrical angles θe, each of an on-command signal indicating that an upper arm switch is to be turned on and a lower arm switch is to be turned off and an off-command signal indicating that an upper arm switch is to be turned off and a lower arm switch is to be turned on. In the present embodiment, signals having different logical values are used as the on and off-command signals. More specifically, a logical H signal is used as the on-command signal, and a logical L signal is used as the off-command signal. Note that some of the pulse patterns stored in the pattern storage unit 38e are symmetrical about the center (180°) of one electrical angle period from 0° to 360°. Specifically, logical values at a pair of timings at equal electric angular distances from the center are opposite.

In the present embodiment, the pattern storage unit 38e stores, as pulse patterns, electrical angles at which the switch from one of the on-command signal and the off-command signal to the other is commanded. In the example of FIG. 4, α0, α1, α2, α3, and α4 are presented as switching timings that are electrical angles at which the switch from one of the on-command signal and the off-command signal to the other is commanded. It is to be noted that pulse patterns may be associated with command voltage amplitudes Vr instead of modulation factors Mr.

The pulse pattern selecting unit 38d selects one appropriate pulse pattern on the basis of the synchronous number N, the modulation factor Mr, and the mode T. The pulse pattern selecting unit 38d outputs the switching timings a of the selected pulse pattern to an angle comparison unit 38f. Note that a method of selecting a pulse pattern will be described in detail later.

The angle comparison unit 38f selects, from among the input switching timings a, a switching timing corresponding to an addition value θv calculated by adding the electrical angle θe and the command voltage phase δ by an addition unit 38g. The angle comparison unit 38f generates and outputs the PWM signals GU, GV, and GW on the basis of the selected switching timing a.

Figure 5:
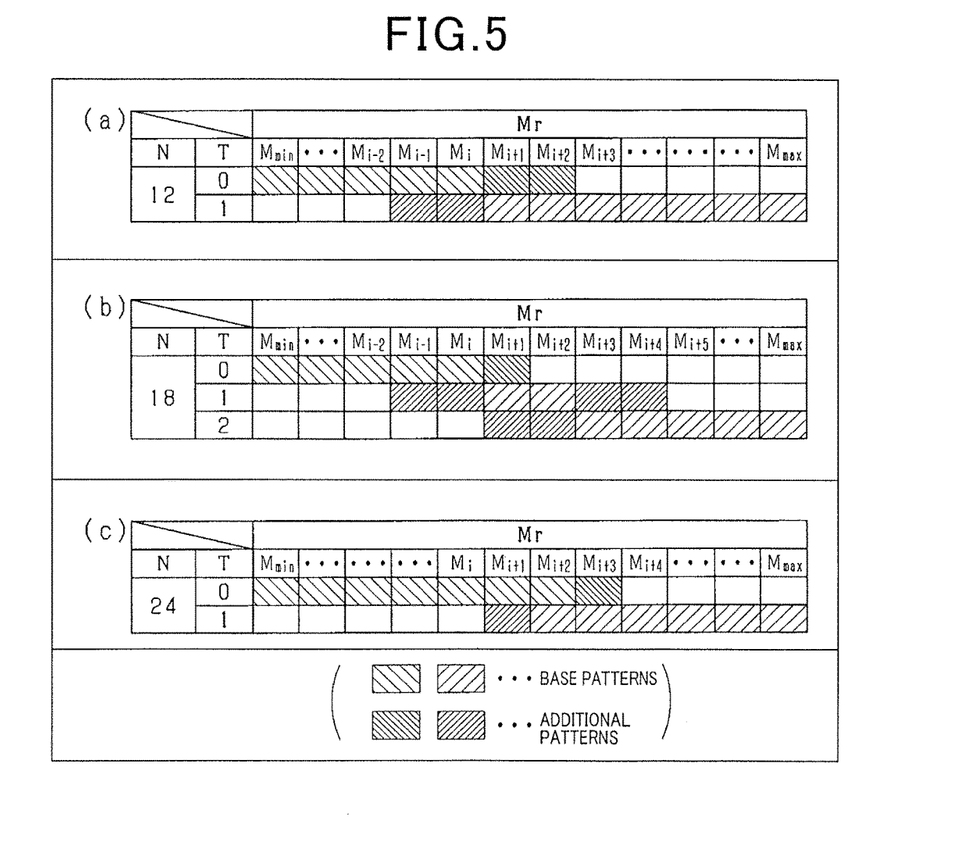
FIG. 5 is a diagram illustrating map information of pulse patterns associated with synchronous numbers and modulation factors.

The pattern storage unit 38e stores map information of pulse patterns associated with synchronous numbers N, modulation factors Mr, and modes T as illustrated in FIG. 5. One pulse pattern is stored in each of the hatched regions selected by synchronous numbers N, modulation factors Mr, and modes T. Note that no pulse patterns are stored in the unhatched regions. The synchronous numbers N in the examples of FIG. 5 are 12, 18, and 24. Hereinafter, a method of generating pulse patterns for a synchronous number N of 12 will be described.

Figure 6:
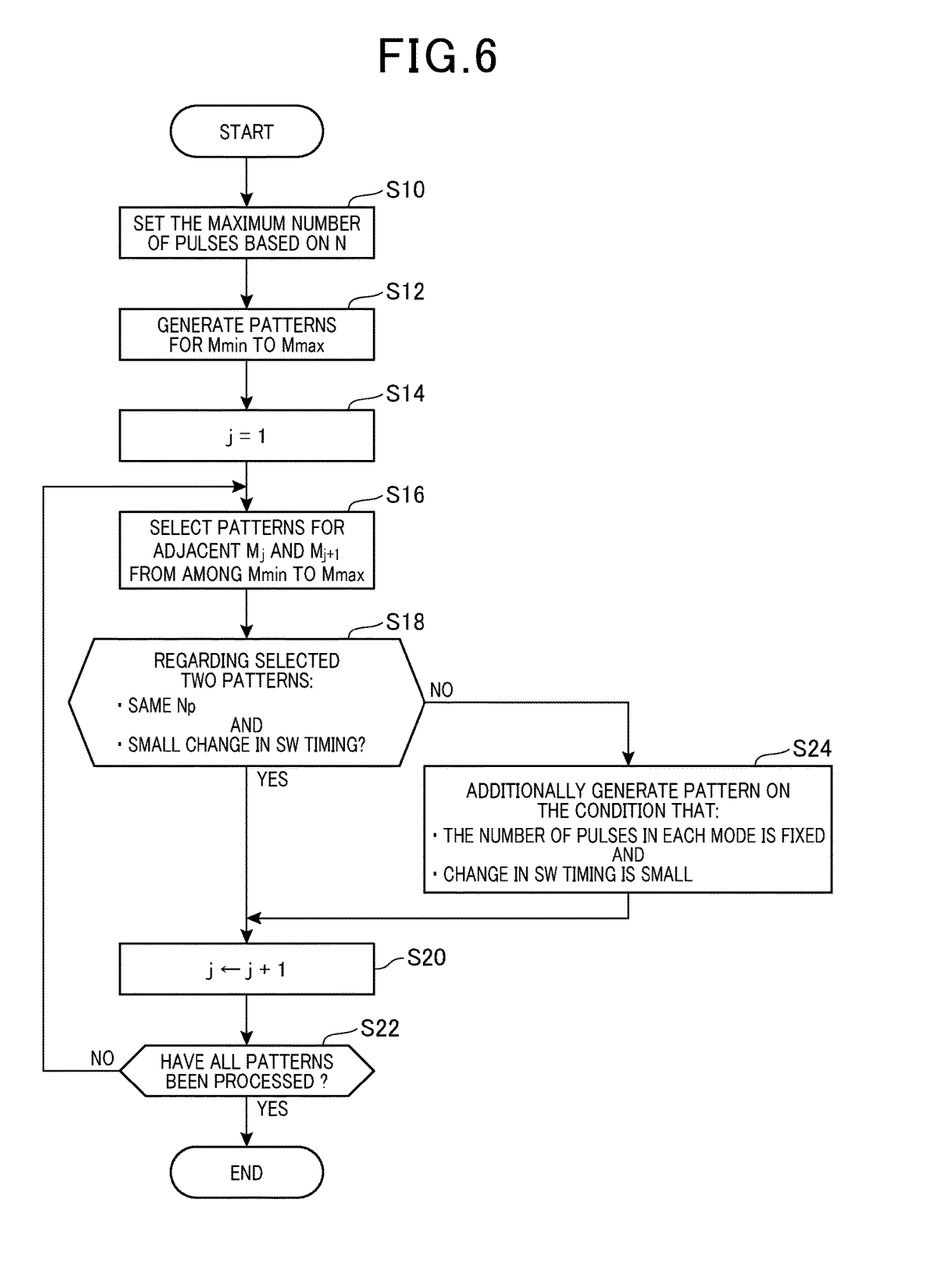
FIG. 6 is a flowchart illustrating a procedure for generating pulse patterns in a design process.

FIG. 6 illustrates a procedure for generating pulse patterns in a design process for the control device 30.

In step S10, the maximum number of pulses included in a pulse pattern is set on the basis of the synchronous number N. The number of pulses is the number of switches from logical L to logical H in one electrical angle period. In the following process of generating pulse patterns, the number of pulses included in a pulse pattern shall not exceed the maximum number of pulses.

Figure 7:
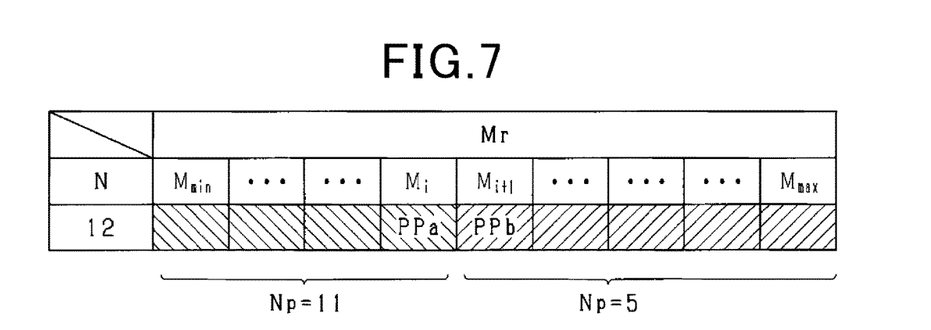
FIG. 7 is a diagram illustrating map information of base patterns associated with a synchronous number and modulation factors.

In step S12, as illustrated in FIG. 7, pulse patterns corresponding to a plurality of modulation factors Mr in the range of a lower limit modulation factor Mmin to an upper limit modulation factor Mmax are generated. In the present embodiment, a pulse pattern whose number of pulses Np is 11 is generated for each of the modulation factors Mr in the range of the lower limit modulation factor Mmin to an (i)-th modulation factor Mi, and a pulse pattern whose number of pulses Np is 5 is generated for each of the modulation factors Mr in the range of an (i+1)-th modulation factor Mi+1 adjacent to the (i)-th modulation factor Mi to the upper limit modulation factor Mmax. Hereinafter, pulse patterns generated in step S12 are referred to as base patterns. In the example illustrated in FIG. 7, each base pattern is generated on the basis of a two-phase modulation method.

After step S14, it is determined whether the change from one of the base patterns generated in step S12 to the adjacent base pattern is large. More specifically, in step S16, adjacent modulation factors Mj and Mj+1 are sequentially selected in ascending order from among the modulation factors in the range of the lower limit modulation factor Mmin to the upper limit modulation factor Mmax.

In step S18, it is determined whether the selected two base patterns satisfy both the first condition that they have the same number of pulses Np and the second condition that the change in switching timing is small. If it is determined in step S18 that the two conditions are satisfied, the process returns to step S16 where the next modulation factors Mj+1 and Mj+2 are selected in ascending order.

Figure 8:
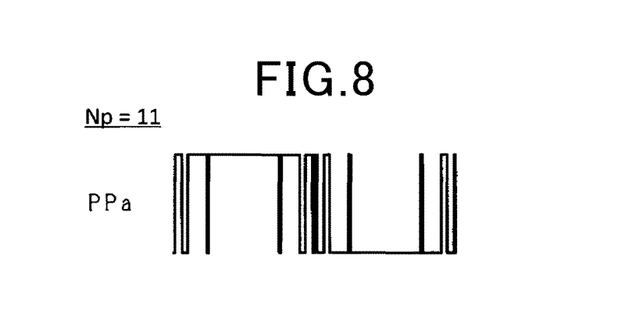
FIG. 8 is a diagram schematically illustrating a base pattern whose number of pulses is 11.
Figure 9:
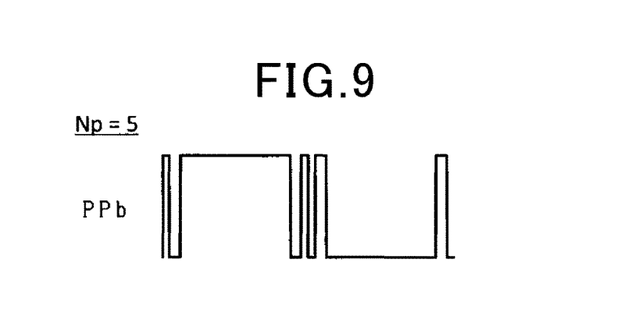
FIG. 9 is a diagram schematically illustrating a base pattern whose number of pulses is 5.

In contrast, if it is determined in step S18 that at least one of the two conditions is not satisfied, the process proceeds to step S24. An exemplary case where it is determined that the first condition is not satisfied will be described with reference to FIGS. 7 to 9. FIG. 8 is a diagram illustrating a base pattern PPa whose number of pulses Np is 11, and FIG. 9 is a diagram illustrating a base pattern PPb whose number of pulses Np is 5. The base pattern PPa corresponds to the (i)-th modulation factor Mi, and the base pattern PPb corresponds to the (i+1)-th modulation factor Mi+1. Since the number of pulses of the base pattern PPa and the number of pulses of the base pattern PPb are different from each other, the first condition is not satisfied.

Figure 10:
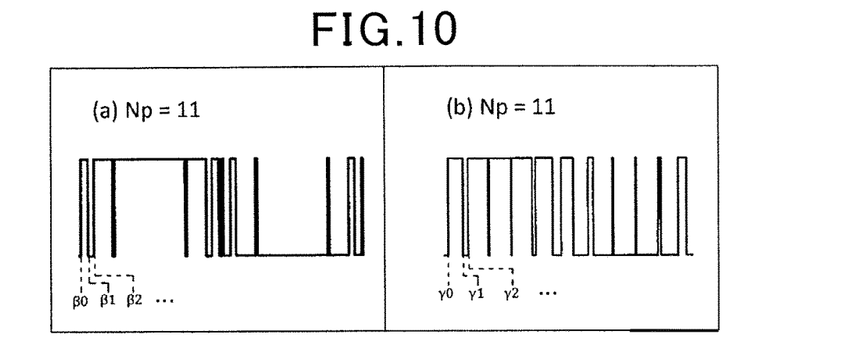
FIG. 10 is a diagram schematically illustrating base patterns having different switching timings.

An exemplary case where it is determined that the second condition is not satisfied is illustrated in FIG. 10. Both the number of pulses Np of the base pattern illustrated in FIG. 10(a) and the number of pulses Np of the base pattern illustrated in FIG. 10(b) are 11. The base pattern illustrated in FIG. 10(a) is referred to as a first pattern, and the base pattern illustrated in FIG. 10(b) is referred to as a second pattern. Switching timings of the first pattern illustrated in FIG. 10(a) are denoted by β0, β1, β2, etc., and switching timings of the second pattern illustrated in FIG. 10(b) are denoted by γ0, γ1, γ2, etc.

In the present embodiment, the phrase "the change in switching timing is small" means that the absolute value of the difference between each switching timing of the first pattern defined in ascending order of electrical angles and the corresponding switching timing of the second pattern is less than a predetermined value ΔTth as indicated by the following equation (eq2).

[Formula 2]

$$\left.\begin{array}{l}|\beta_0 - \gamma_0| < \Delta Tth \\ |\beta_1 - \gamma_1| < \Delta Tth \\ |\beta_2 - \gamma_2| < \Delta Tth \\ \vdots \end{array}\right\} \quad (eq2)$$

In the present embodiment, the predetermined value ΔTth is set using the following equation (eq 3).

[Formula 3]

$$\Delta Tth = \frac{360°}{2 \times N} \quad (eq3)$$

Figure 11:
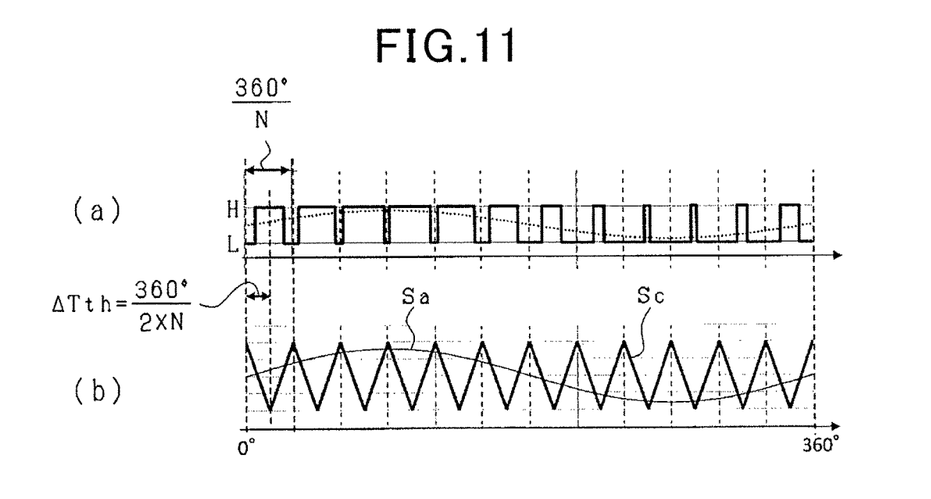
FIG. 11 is a diagram for explaining a method of setting a predetermined value.

Assuming that a PWM process that is based on magnitude comparison between the carrier Sc and a fundamental wave voltage component Sa is performed, the predetermined value ΔTth corresponds to half of a carrier period as illustrated in FIG. 11. The setting of the predetermined value ΔTth is based on the fact that the logic of a pulse pattern is switched within the range of "360°/(2×N)" if conditions for generating pulse patterns other than the modulation factor Mr are fixed.

Suppose a "NO" decision is made in step S18 for two base patterns, and the base pattern is switched from one of the two base patterns to the other. In this case, although the synchronous number N remains the same even after the switching, for example, the influence of the dead time on the output voltage from the inverter 20 significantly changes due to the large difference in pattern. As a result, the output power from the inverter 20 fluctuates, which can cause fluctuations in the torque of the motor generator 10. Note that the wait time for pulse pattern switching may be provided to limit torque fluctuations. In this case, however, the torque responsiveness of the motor generator 10 is reduced.

Figure 12:
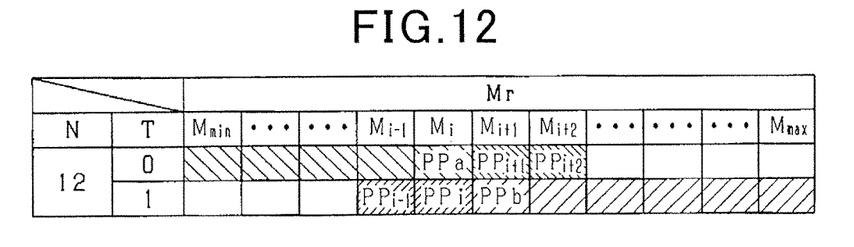
FIG. 12 is a diagram illustrating map information of base patterns and additional patterns associated with a synchronous number and modulation factors.

Therefore, in step S24, a pulse pattern capable of limiting torque fluctuations is additionally generated. Hereinafter, an additionally generated pulse pattern is referred to as an additional pattern. First, the base patterns corresponding to the respective modulation factors Mr in the range of the lower limit modulation factor Mmin to the (i)-th modulation factor Mi illustrated in FIG. 7 are allocated to Mode 0 (Mode zero) as illustrated in FIG. 12. In Mode 0, the two-phase modulation method is used, and the number of pulses Np is 11. In the present embodiment, the base patterns allocated to Mode 0 correspond to first base patterns. In addition, the base patterns corresponding to the respective modulation factors Mr in the range of the (i+1)-th modulation factor Mi+1 to the upper limit modulation factor Mmax are allocated to Mode 1. In Mode 1, the two-phase modulation method is used, and the number of pulses Np is 5. In the present embodiment, the base patterns allocated to Mode 1 correspond to second base patterns.

Then, in Mode 0, an additional pattern PPi+1 corresponding to the (i+1)-th modulation factor Mi+1 is generated so as to satisfy the condition that the additional pattern PPi+1 has the same number of pulses Np (Np=11) as the base pattern PPa corresponding to the (i)-th modulation factor Mi and the condition that the above equation (eq 2) is satisfied in relation to the (i)-th modulation factor Mi. In addition, in Mode 0, an additional pattern PPi+2 corresponding to an (i+2)-th modulation factor Mi+2 is generated so as to satisfy the condition that the additional pattern PPi+2 has the same number of pulses Np as the additional pattern PPi+1 corresponding to the (i+1)-th modulation factor Mi+1 and the condition that the above equation (eq 2) is satisfied in relation to the (i+1)-th modulation factor Mi+1. Consequently, the additional patterns PPi+1 and PPi+2 are generated so that the change from the base pattern PPa corresponding to the (i)-th modulation factor Mi to the additional patterns PPi+1 and PPi+2 is smaller than the change from the base pattern PPa corresponding to the (i)-th modulation factor Mi to the base patterns corresponding to the respective modulation factors Mi+1 and Mi+2 in Mode 1. In the present embodiment, the additional patterns PPi+1 and PPi+2 correspond to upper additional patterns. Note that in the present embodiment, no additional patterns are generated in Mode 0 for the respective modulation factors Mr in the range of an (i+3)-th modulation factor Mi+3 to the upper limit modulation factor Mmax.

Moreover, in Mode 1, an additional pattern PPi corresponding to the (i)-th modulation factor Mi is generated so as to satisfy the condition that the additional pattern PPi has the same number of pulses Np (Np=5) as the base pattern PPb corresponding to the (i+1)-th modulation factor Mi+1 and the condition that the above equation (eq 2) is satisfied in relation to the (i+1)-th modulation factor Mi+1. In addition, in Mode 1, an additional pattern PPi−1 corresponding to an (i−1)-th modulation factor Mi−1 is generated so as to satisfy the condition that the additional pattern PPi−1 has the same number of pulses Np as the additional pattern PPi corresponding to the (i)-th modulation factor Mi and the condition that the above equation (eq 2) is satisfied in relation to the (i)-th modulation factor Mi. Consequently, the additional patterns PPi−1 and PPi are generated so that the change from the base pattern PPb corresponding to the (i+1)-th modulation factor Mi+1 to the additional patterns PPi−1 and PPi is smaller than the change from the base pattern PPb corresponding to the (i+1)-th modulation factor Mi+1 to the base patterns corresponding to the respective modulation factors Mi−1 and Mi in Mode 0. In the present embodiment, the additional patterns PPi−1 and PPi correspond to lower additional patterns. Note that in the present embodiment, no additional patterns are generated in Mode 1 for the respective modulation factors Mr in the range of the lower limit modulation factor Mmin to an (i−2)-th modulation factor Mi−2.

The map information illustrated in FIG. 5(a) is generated using the above-described method. Note that map information having three modes is illustrated in FIG. 5(b). More specifically, in Mode 0, base patterns whose number of pulses is 17 are generated using a three-phase modulation method. In Mode 1, base patterns whose number of pulses is 9, for example, are generated using the three-phase modulation method. The reason why the number of pulses in Mode 1 is different from that in Mode 0 is that the number of pulses needs to be reduced to make a logical H period equal to or longer than a certain width, for example, in order to satisfy the condition that each arm switch is protected and the condition that a deterioration in torque controllability is prevented. Specifically, an excessive surge occurs if a minute-width pulse is input to the gate of each arm switch, which can deteriorate the reliability of the arm switch. In addition, an on-operation command for a switch is lost if a logical H period is shorter than the dead time, which can deteriorate torque controllability.

In Mode 2 of FIG. 5(b), base patterns having the same number of pulses as the base patterns in Mode 1, for example, are generated using the two-phase modulation method. The two-phase modulation method is employed for the purpose of reducing loss in the inverter 20. In the two-phase modulation, the operation states of the upper and lower arm switches of the respective phases are sequentially fixed at predetermined intervals, and the upper and lower arm switches constituting the two phases other than the fixed phase are alternately turned on. More specifically, for example, the upper and lower arm switches of the respective phases are sequentially fixed in the off and on states, respectively, at electrical angle intervals of 120°.

Next, a procedure for a pulse pattern selecting process will be described with reference to FIG. 13. This process is repeatedly executed by the pulse pattern selecting unit 38d, for example, at stated periods.

The series of steps begins in step S30 by acquiring the synchronous number N set by the synchronous number setting unit 38b and the modulation factor Mr calculated by the modulation factor calculating unit 38c. The acquired synchronous number N and modulation factor Mr are values to be set in the next processing period.

In the subsequent step S32, it is determined whether there is a plurality of pulse patterns corresponding to the modulation factor Mr in the map information corresponding to the acquired synchronous number N. Here, pulse patterns include at least one of base patterns and additional patterns.

If a "NO" decision is made in step S32, it is determined that there is only one pulse pattern corresponding to the next modulation factor Mr, and the process proceeds to step S34. In step S34, the one pulse pattern is selected and output to the angle comparison unit 38f.

In contrast, if a "YES" decision is made in step S32, the process proceeds to step S36 where one pulse pattern with the smallest change from the currently set pulse pattern is selected from among the plurality of pulse patterns. More specifically, the pulse pattern having the same number of pulses as the currently set pulse pattern and having switching timings with the smallest difference from the respective switching timings of the currently set pulse pattern is selected. Then, the selected pulse pattern is output to the angle comparison unit 38f.

Figure 14:
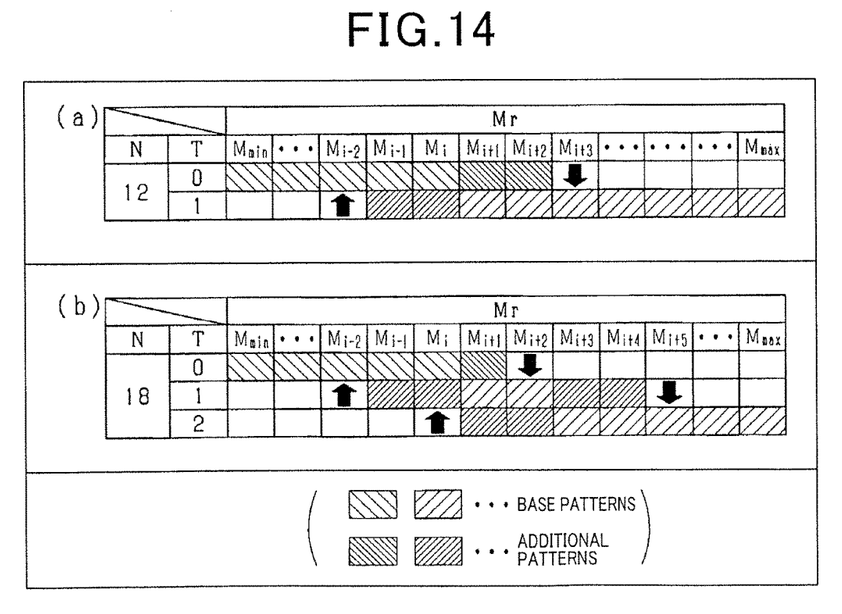
FIG. 14 is a diagram illustrating how a pulse pattern is selected.

The method of selecting a pulse pattern will be further described using FIG. 14. Note that FIGS. 14(a) and 14(b) are the map information illustrated in FIGS. 5(a) and 5(b) above.

First, refer to FIG. 14(a).

When the modulation factor Mr increases from the (i)-th modulation factor Mi to the (i+1)-th modulation factor Mi+1, the pulse pattern is switched from the pulse pattern corresponding to Mode 0 and the (i)-th modulation factor Mi to the pulse pattern corresponding to Mode 0 and the (i+1)-th modulation factor Mi+1. This is because the change from the pulse pattern corresponding to Mode 0 and the (i)-th modulation factor Mi to the pulse pattern corresponding to Mode 0 and the (i+1)-th modulation factor Mi+1 is smaller than the change from the pulse pattern corresponding to Mode 0 and the (i)-th modulation factor Mi to the pulse pattern corresponding to Mode 1 and the (i+1)-th modulation factor Mi+1.

After that, when the modulation factor Mr increases from the (i+2)-th modulation factor Mi+2 to the (i+3)-th modulation factor Mi+3, the pulse pattern is switched from the pulse pattern corresponding to Mode 0 and the (i+2)-th modulation factor Mi+2 to the pulse pattern corresponding to Mode 1 and the (i+3)-th modulation factor Mi+3. This is because there is only one pulse pattern corresponding to the (i+3)-th modulation factor Mi+3.

After that, when the modulation factor Mr decreases from the (i+1)-th modulation factor Mi+1 to the (i)-th modulation factor Mi, the pulse pattern is switched from the pulse pattern corresponding to Mode 1 and the (i+1)-th modulation factor Mi+1 to the pulse pattern corresponding to Mode 1 and the (i)-th modulation factor Mi. This is because the change from the pulse pattern corresponding to Mode 1 and the (i+1)-th modulation factor Mi+1 to the pulse pattern corresponding to Mode 1 and the (i)-th modulation factor Mi is smaller than the change from the pulse pattern corresponding to Mode 1 and the (i+1)-th modulation factor Mi+1 to the pulse pattern corresponding to Mode 0 and the (i)-th modulation factor Mi.

After that, when the modulation factor Mr decreases from the (i−1)-th modulation factor Mi−1 to the (i−2)-th modulation factor Mi−2, the pulse pattern is switched from the pulse pattern corresponding to Mode 1 and the (i−1)-th modulation factor Mi−1 to the pulse pattern corresponding to Mode 0 and the (i−2)-th modulation factor Mi−2. This is because there is only one pulse pattern corresponding to the (i−2)-th modulation factor Mi−2.

Note that in a case where three modes are prepared as illustrated in FIG. 14(b), pulse patterns are selected in the same manner as described with reference to FIG. 14(a).

According to the above-described configuration, hysteresis can be provided for the switch from pulse patterns corresponding to a certain mode to pulse patterns corresponding to another mode. Consequently, even when the modulation factor Mr changes across the (i)-th modulation factor Mi and the (i+1)-th modulation factor Mi+1, frequent switching between pulse patterns corresponding to Mode 0 and pulse patterns corresponding to Mode 1 can be avoided. Therefore, torque fluctuations in the motor generator 10 triggered by pulse pattern switching can be suitably limited.

Second Embodiment

Hereinafter, the difference between the first embodiment and the second embodiment will be mainly described with reference to the drawings. In the present embodiment, the PWM signals GU, GV, and GW are generated by synchronous PWM control instead of the pulse pattern control.

Figure 15:
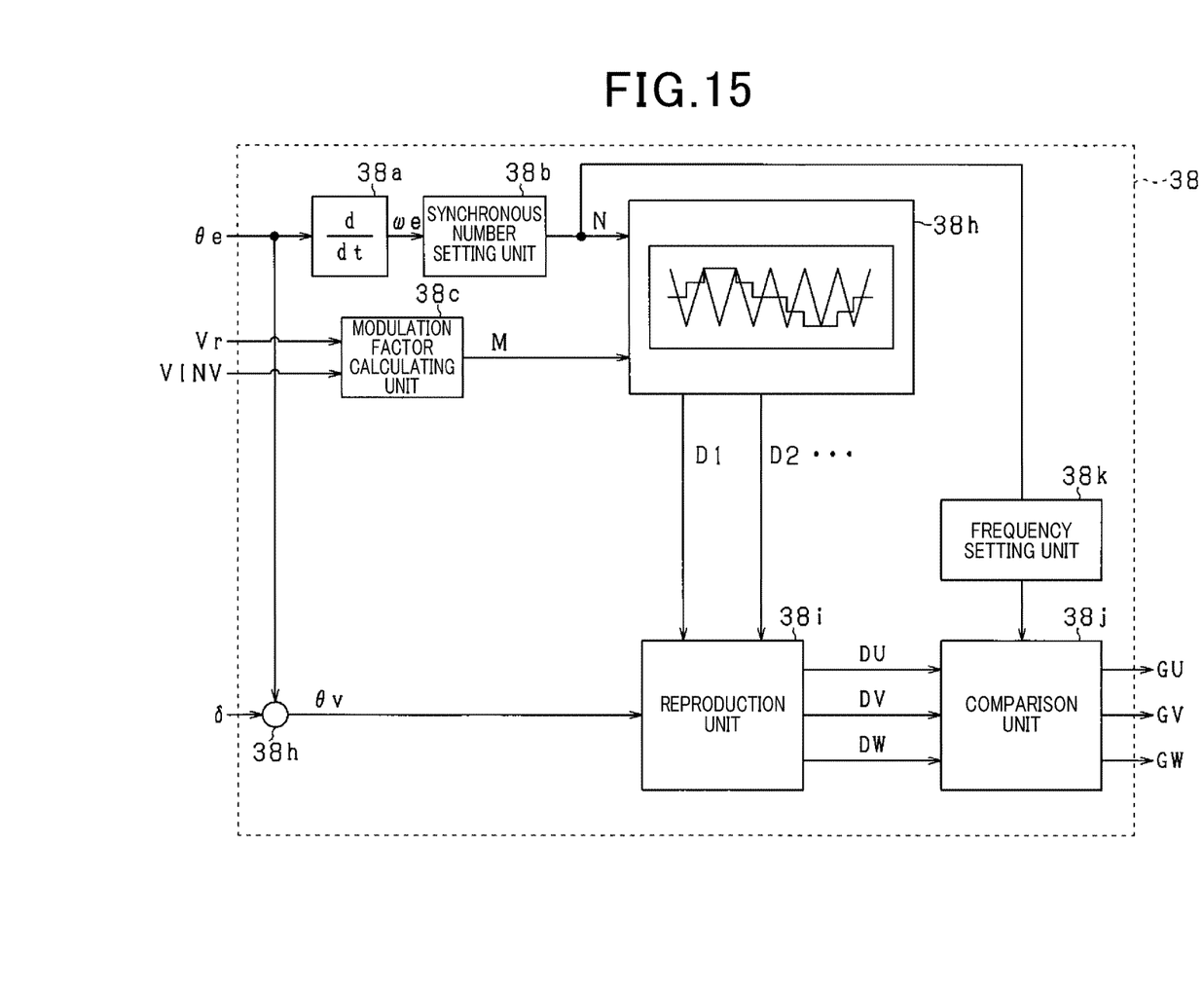
FIG. 15 is a block diagram illustrating a process of a modulator according to a second embodiment.

FIG. 15 is a block diagram illustrating a process of the modulator 38 according to the present embodiment. Note that the components in FIG. 15 identical to those illustrated in FIG. 3 above are denoted by the same reference signs for convenience.

A time ratio pattern selecting unit 38h selects a time ratio pattern, i.e., a command time ratio over one electrical angle period, on the basis of the synchronous number N set by the synchronous number setting unit 38b and the modulation factor Mr calculated by the modulation factor calculating unit 38c. The time ratio is the ratio "Ton/Tsw" of an on-operation period Ton to one switching period Tsw for each arm switch. In the present embodiment, a time ratio pattern corresponds to an operation pattern. Time ratio patterns are stored in advance in a storage unit of the control device 30 in association with synchronous numbers N, modulation factors Mr, and modes T. A time ratio pattern is generated using the idea of synchronous triangular wave comparison PWM control. In other words, a time ratio pattern is a pattern that can change every carrier half period. A time ratio pattern is generated in the same manner as a pulse pattern described in the first embodiment. Specifically, a plurality of time ratio patterns is stored for the same modulation factor Mr.

Figure 13:
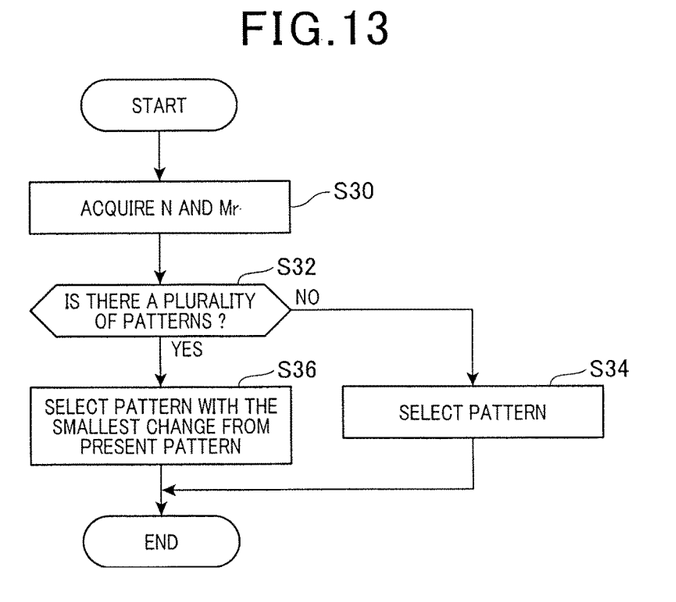
FIG. 13 is a flowchart illustrating a procedure for a pulse pattern selecting process.

The time ratio pattern selecting unit 38h selects one appropriate time ratio pattern in the same manner as illustrated in FIG. 13 above. The time ratio pattern selecting unit 38h outputs, to a reproduction unit 38i, values of the selected time ratio pattern corresponding to the respective carrier half periods.

The reproduction unit 38i selects a value corresponding to the addition value θv output from the addition unit 38g from among the input values of the time ratio pattern. The reproduction unit 38i generates U, V, and W-phase command time ratios DU, DV, and DW on the basis of the selected value, and outputs them to a comparison unit 38j.

The comparison unit 38j generates the PWM signals GU, GV, and GW through a PWM process that is based on magnitude comparison between the U, V, and W-phase command time ratios DU, DV, and DW output from the reproduction unit 38i and the carrier Sc having the carrier frequency fc set by the frequency setting unit 38k. A carrier according to the present embodiment is a triangular wave signal that is based on a dual slope modulation scheme, and in particular an isosceles triangular signal with equal increase and decrease rates. The increase rate and decrease rate are quantified, for example, by an increase and decrease in carrier per unit change in electrical angle. A carrier according to the present embodiment is a signal with a minimum value of zero and a maximum value of one. Note that the frequency setting unit 38k sets the carrier frequency fc on the basis of the synchronous number N such that the command time ratios DU, DV, and DW and the carrier Sc are synchronized with each other. More specifically, the frequency setting unit 38k sets the carrier frequency fc such that the carrier period is equal to the value obtained by dividing one electrical angle period by the synchronous number N.

According to the present embodiment described above, effects similar to those of the first embodiment can be obtained.

Other Embodiments

Note that the above-mentioned embodiments may be changed and implemented in the following manner.

In the above-mentioned embodiments, in a case where there are three or more candidates for pulse patterns corresponding to the modulation factor Mr, a pulse pattern other than the pulse pattern with the largest change from the currently set pulse pattern may be selected. Torque fluctuations can also be limited in this case, as compared with a case where the pulse pattern with the largest change is selected.

The predetermined value ΔTth may be less than half of the value obtained by dividing one electrical angle period by the synchronous number.

In the map information illustrated in FIG. 5(a) in the above-mentioned embodiments, any of the upper additional patterns PPi+1 and PPi+2 and the lower additional patterns PPi−1 and PPi may not be generated.

In step S36 of FIG. 13 in the above-mentioned embodiments, a pulse pattern with a small change may be selected on the basis of only one of the number of pulses and the difference in switching timing.

Instead of the three-phase inverter, an inverter having a single phase, two phases, or four or more phases may be used.

A motor generator that is a load electrically connected to an inverter may be, for example, a wound-field motor generator instead of a permanent magnet embedded motor generator. A motor generator may be, for example, an induction machine instead of a synchronous machine. Further, the load is not limited to a rotating electrical machine.

The present disclosure has been described with reference to examples, but it is to be understood that the present disclosure is not limited to the examples and structures. The present disclosure covers various modifications and equivalent variations. In addition to various combinations and forms, other combinations and forms including one or more/less elements thereof are also within the spirit and scope of the present disclosure.

The invention claimed is:

1. An inverter control device that is applied to an inverter including series connections each of an upper arm switch and a lower arm switch, wherein
a time-series pattern that defines a switching pattern for each of the upper arm switch and the lower arm switch is defined as an operation pattern,
the inverter control device comprises:
a pattern storage unit that stores a plurality of the operation patterns associated with each of synchronous numbers and modulation factors, the synchronous numbers each defining an upper limit of the number of switching operations for each of the arm switches;
a pattern selecting unit that selects an appropriate operation pattern from among the operation patterns stored in the pattern storage unit; and
an operation unit that operates the upper arm switch and the lower arm switch on the basis of the operation pattern selected by the pattern selecting unit,
the pattern storage unit stores a plurality of the operation patterns associated with the same modulation factor for the same synchronous number, and
in a case where there is a plurality of next patterns as the operation patterns corresponding to a next modulation factor, the pattern selecting unit selects, from among the next patterns, an operation pattern other than the operation pattern with the largest change from a currently set operation pattern.

2. The inverter control device according to claim 1, wherein
the pattern selecting unit selects, from among the next patterns, an operation pattern other than an operation pattern with the largest change from the number of switching operations of the currently set operation pattern.

3. The inverter control device according to claim 2, wherein
the pattern selecting unit selects, from among the next patterns, an operation pattern with the smallest change from the number of switching operations of the currently set operation pattern.

4. The inverter control device according to claim 1, wherein
in a case where the number of switching operations of the currently set operation pattern is equal to the number of switching operations of the operation pattern to be set next time, the pattern selecting unit selects, from among the next patterns, such an operation pattern that an absolute value of a difference between each switching timing of the currently set operation pattern in one electrical angle period and a corresponding switching timing of the operation pattern to be set next time in one electrical angle period is equal to or less than a predetermined value.

5. The inverter control device according to claim 4, wherein
the synchronous number is defined as a value obtained by dividing one electrical angle period of a fundamental wave voltage component output from the inverter by an integral multiple of one switching period of each of the arm switches, and
the predetermined value is equal to or less than half of a value obtained by dividing one electrical angle period by the synchronous number.

6. The inverter control device according to claim 1, wherein
the operation pattern associated with each modulation factor in the range of a first modulation factor to a second modulation factor greater than the first modulation factor is defined as a first base pattern,
the operation pattern associated with each modulation factor in the range of a third modulation factor adjacent to the second modulation factor to a fourth modulation factor greater than the third modulation factor is defined as a second base pattern, at least one of a modulation method and the number of switching operations of the second base pattern being different from those of the first base pattern,
the operation pattern whose modulation method and number of switching operations are the same as those of the first base pattern is defined as an upper additional pattern, the upper additional pattern being associated with the third modulation factor and each modulation factor greater than the third modulation factor,
the upper additional pattern is defined for the third modulation factor and each modulation factor greater than the third modulation factor so that a change from the first base pattern corresponding to the second modulation factor to the upper additional pattern is smaller than a change from the first base pattern corresponding to the second modulation factor to the second base pattern, and
the pattern storage unit stores the first base pattern, the second base pattern, and the upper additional pattern.

7. The inverter control device according to claim 1, wherein
the operation pattern associated with each modulation factor in the range of a first modulation factor to a second modulation factor greater than the first modulation factor is defined as a first base pattern,
the operation pattern associated with each modulation factor in the range of a third modulation factor adjacent to the second modulation factor to a fourth modulation factor greater than the third modulation factor is defined as a second base pattern, at least one of a modulation method and the number of switching operations of the second base pattern being different from those of the first base pattern,
the operation pattern whose modulation method and number of switching operations are the same as those of the second base pattern is defined as a lower additional pattern, the lower additional pattern being associated with the second modulation factor and each modulation factor smaller than the second modulation factor, the lower additional pattern is defined for the second modulation factor and each modulation factor smaller than the second modulation factor so that a change from the second base pattern corresponding to the third modulation factor to the lower additional pattern is smaller than a change from the second base pattern corresponding to the third modulation factor to the first base pattern, and the pattern storage unit stores the first base pattern, the second base pattern, and the lower additional pattern.

* * * * *